May 18, 1965 E. C. GIAIMO, JR Re. 25,779

ELECTROSTATIC PRINTING

Original Filed June 30, 1953 2 Sheets-Sheet 1

INVENTOR.
EDWARD C. GIAIMO, JR.
BY Morris A. Rabkin
ATTORNEY

May 18, 1965 E. C. GIAIMO, JR Re. 25,779

ELECTROSTATIC PRINTING

Original Filed June 30, 1953 2 Sheets-Sheet 2

INVENTOR.
EDWARD C. GIAIMO, JR.

BY Morris Rabai

ATTORNEY

United States Patent Office

Re. 25,779
Reissued May 18, 1965

25,779
ELECTROSTATIC PRINTING

Edward C. Giaimo, Jr., Princeton, N.J., assignor to Radio Corporation of America, a corporation of Delaware Original No. 2,984,163, dated May 16, 1961, Ser. No. 365,152, June 30, 1953. Application for reissue Aug. 16, 1962, Ser. No. 218,221
14 Claims. (Cl. 95—1.7)

Matter enclosed in heavy brackets [ ] appears in the original patent but forms no part of this reissue specification; matter printed in italics indicates the additions made by reissue.

This invention relates to a page printer of the electrostatic type, and, more particularly, to an electrostatic printer having a developer powder applicator brush whose bristles are formed of ferromagnetic powder suspended from a magnet pole.

In many libraries and record keeping institutions it has become a common practice to photograph and reduce voluminous records to convenient microfilm size. These small rolls of film may be easily stored in comparison to the space consuming volumes they replace. Utilizing these films to extract information is made rather difficult under the present viewing arrangements. A common method of viewing is to project the film frames upon a ground glass plate. The disadvantage of this method is that the viewer must continuously position himself at the projector in order to see what is on each frame. There is also no permanent record available for any notations that may be made. Only one frame can be seen at a time and unless there are several projectors available, one frame cannot be simultaneously compared with another.

A method of overcoming this difficulty would be to photograph or to prepare an enlarged photograph of the material on the frame. The photographic process is relatively expensive. A dark room, wet chemicals, and special apparatus for developing and drying film are required. Printing by the electrostatic method would overcome most of these difficulties. There is a need for an electrostatic printer of simple inexpensive construction which will conveniently produce permanent prints from film rolls similar to 35 mm. microfilm.

Progress has been hindered by several shortcomings in existing electrostatic printers. One of these was lack of a simple developing powder applicator which would apply a uniform coating of developing powder across all parts of the charged and light exposed sheet. This problem has been solved by forming a powder retaining brush of bristles formed of ferromagnetic powder bunched together by, and suspended from, a magnet. This brush applicator is disclosed in the copending application for Letters Patent of the United States of Harold G. Greig, Serial No. 344,123, filed March 23, 1953, now U.S. Patent 2,874,063, issued February 17, 1959.

An object of this invention is to provide an electrostatic printer which will conveniently and rapidly print the information contained on a frame of film.

A further object of this invention is to provide an electrostatic printer which will furnish a permanent record of the information on microfilm rolls in convenient form and which can be operated by inexperienced, unskilled personnel.

Another object of this invention is to provide an improved developing powder brush applicator for an electrostatic printer which has magnetically held bristles of ferromagnetic powder which are relatively stiff, evenly distributed over the entire brushing surface and to which developing powder can be conveniently supplied.

A still further object of this invention is to provide an improved developing powder applicator of the type described which has an even distribution of powder or toner throughout the entire length of the brush.

A still further object of this invention is to provide an electrostatic printer of the type described which is inexpensive to manufacture, simple to operate and reliable in operation.

A still further object of this invention is to provide an improved developing powder applicator of the magnetically suspended ferromagnetic powder type which has even distribution of bristles over the entire length of the brush and will permit an even supply of developer or toner to be added during normal operation of the brush.

An electrostatic printer, according to the present invention, with an improved developer powder applicator brush is constructed in the following manner. A light excluding enclosure is provided so that ambient room light will not interfere with printing. At the top of this enclosure is provided a light projector. A film guide is installed across the aperture of this projector so that the light can be directed through a frame of film adjusted within the guide. As the light travels through the film and into the enclosure, it passes through a lens system which enlarges the image. The enlarged image is projected upon a flat plate or platen within the enclosure. When the proper image is focused, the projector light is turned off while a sheet of photoconductive paper 27 is placed on the platen and the enclosure is sealed. Any suitable photoconductive paper may be employed.

A corona charger is moved across the face of the paper leaving a residual charge over the surface of the paper. The projector light is then turned on which exposes the paper to the image on the frame of film. The paper releases the charge where its surface is struck by light. A latent charge image of the frame of film is left on the surface of the paper. The developer powder applicator brush is then moved across the surface of the paper. The applicator has magnet pole pieces above and below the plane of the sheet of paper joined at their ends by permanent magnets. A ferromagnetic powder is suspended from the upper pole piece forming bristles in contact with the upper surface of the paper. Composition of this type of ferromagnetic carrier powder as well as the developer powder is set forth in the above mentioned application for Letters Patent of the United States of Harold G. Greig, Serial No. 344,123, filed March 23, 1953. In one form of this brush a slot is cut through the upper pole piece substantially across the entire length of the brush. This slot continues down through the bristles which are mutually repulsive. A slot substantially across the entire length of the brush is, therefore, provided into which the developer powder can be conveniently added.

This brush is swept across the entire exposed face of the sheet. The electroscopic powder is drawn off to the charged areas of the paper. An enlarged duplicate of the image on the film slide will therefore be formed on the sheet. When heat is applied this powder or toner which is pigmented will be fused permanently onto the paper and a permanent image or picture is formed.

Other objects and advantages of the present invention will become apparent to those skilled in the art from a reading of the following specification in conjunction with the accompanying drawings in which:

FIGURE 4 is a view in perspective of the magnetic structure for providing the magnetic brush effect; and FIGURE 5 is a section of the magnetic structure of FIG. 4 illustrating the manner in which the developer powder is fed into the slot by means of which it is distributed throughout the entire length of the magnetic structure.

Figure 1:
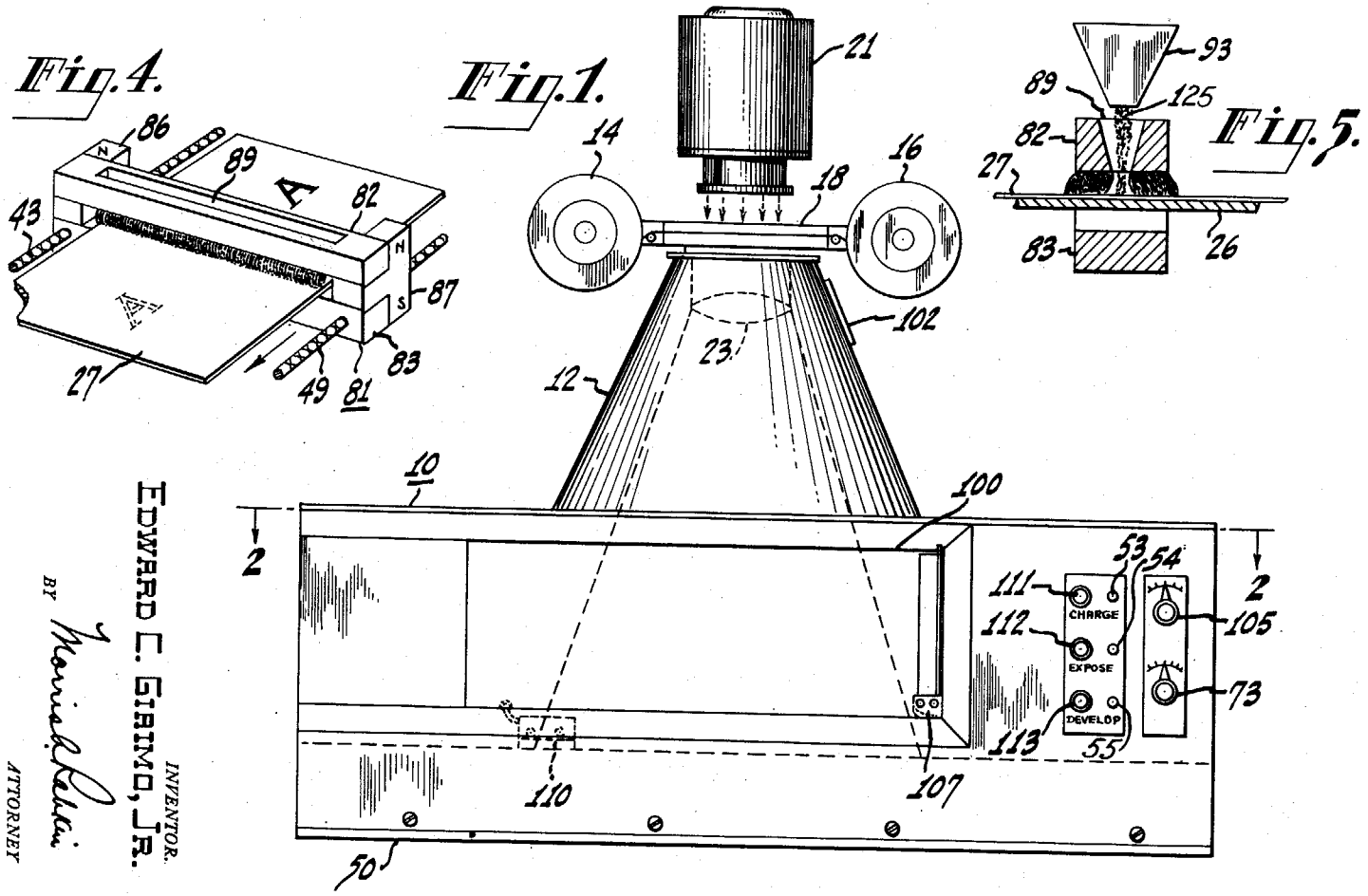
FIGURE 1 is a view in elevation of the printer showing the loading door of the enclosure closed.
Figure 2:
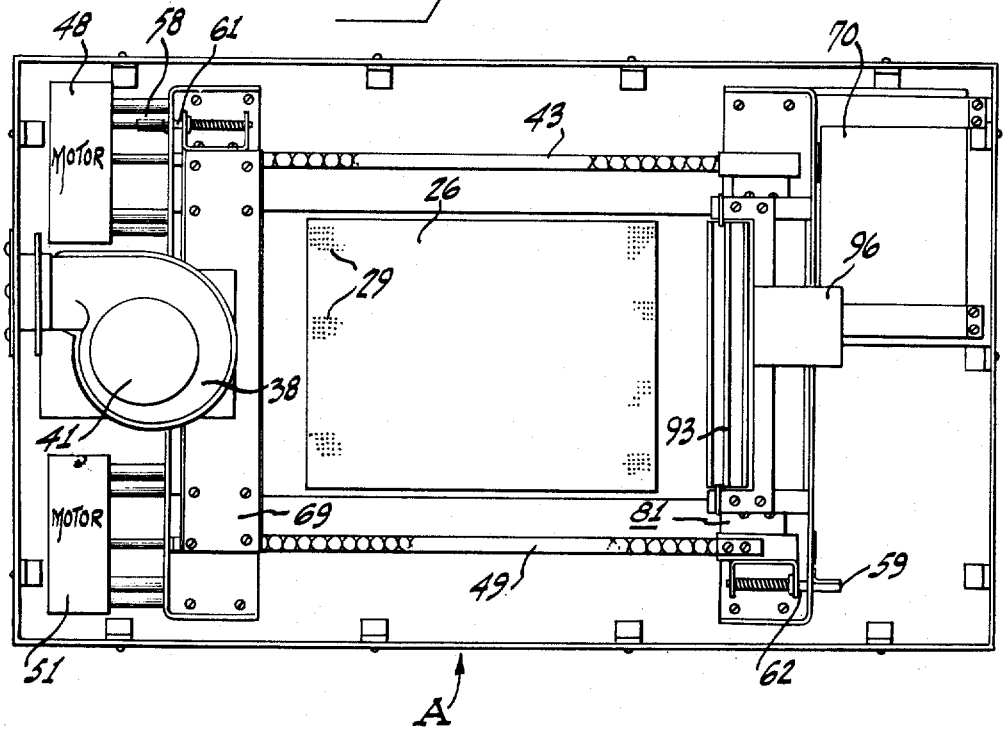
FIGURE 2 is a plan view in section taken on the line 2—2 of FIGURE 1 as viewed in the direction of the arrows.

Referring to the drawing in more detail, reference character 10 indicates the base portion of a substantially light tight housing in which electrostatic printing is conveniently carried out in accordance with the invention. The base portion 10 of the housing is surmounted by a light hood 12 which provides a support for a film reel mechanism comprising film spools 14 and 16 and a film guide 18. A lamp housing 21 is supported above the film guide 18 so as to project light through a selected frame of the film carried by the spools 14 and 16. Reference character 23 designates a lens or lens system employed for imaging copy such as film on a flat platen member 26 which is disposed to receive photoconductive paper which may be of any suitable type, as mentioned heretofore. The platen 26 is suitably supported above the base plate member 28 and is perforated as indicated by reference character 29. An enclosed air box 33 lies beneath the platen 26 and is connected by a suitable conduit or air duct 36 to a suction blower 38 driven by a suitable motor 41.

A grooved drive shaft or double lead screw 43 is suitably supported in bearings within the base portion 10 of the housing and lies above the base plate member 28. Rotation is imparted to the lead screw 43 by a suitable means such as a motor 48. A similar double lead screw 49 is rotatably supported within the base portion 10 of the housing and is driven by suitable mechanical connections from a motor 51. Lead screws similar to those just described are disclosed in "Radio Facsimile" RCA Institutes Technical Press, volume I, page 31. The motors 48 and 51 are suitably connected through control switches such as push buttons 53 and 54 respectively. The motor supports, may, if desired, have limit switches 58 and 59 included in control circuit therewith. The limit switches are operated in well known manner by limit switch operators 61 and 62.

As stated above, the platen 26 is disposed to receive a record receiving member in the nature of a paper sheet having a photoconductive surface. In accordance with the operational procedure to be outlined hereinafter, means are provided for charging the record receiving sheet. In the illustrative example, a charging device 66 spans the platen and rests upon the lead screws 43 and 49 with slidable engagement. It is suitably connected as by a blade (not shown) engaged with the continuous return groove of the lead screw 43 so that as the motor 48 rotates the charging device 66 will traverse the platen 26 and return to its rest position when the push button 53 is pressed. The latter may be arranged to bridge the limit switch 58. The charging device is provided with a conductive shielding top 69 and end members of insulating material to which are secured a wire grid 71 and a second wire grid 72. The grid 71 is or may be connected to the negative pole of a 6,000 volt D.C. source 70 and the grid 72 may be connected to a 1,000 to 2,000 volt negative D.C. top on the high voltage source 70. To adjust the charging voltage where the composition of the photoconductive paper varies, control knob 73 is provided.

Reference character 81 designates generally a magnetic structure which comprises a top pole piece 82 and a bottom pole piece 83 as shown somewhat diagrammatically on FIGS. 4 and 5 of the drawing. The pole pieces 82 and 83 are joined at their ends by T-shaped permanent magnets 86 and 87. The magnets 86 and 87 are so poled that the pole pieces 82 and 83 are of opposite polarity. The magnetic structure 81 is supported for slide engagement upon the lead screw 43 and also rests at its opposite end upon the lead screw 49. A knife blade (not shown), for example, engages with the continuous return groove of the lead screw 49 so that magnetic structure will be propelled over the platen 26 as the motor 51 rotates. The limit switch 59 provides for only one complete excursion of the magnetic structure 81. It is preferred that the motors 48 and 51 be wired in any manner well known in the art so that only one motor is operable at a time.

The pole piece 82 is slotted as indicated by reference character 89 and developer powder 125 may be supplied to the magnetic structure 81 through an elongated chute 92 which lies above an elongated funnel 93. A vibrator 96 agitates the funnel 93. Powder drops from the funnel 93 into the slot 89. It will be understood that it is within the scope of the present invention to have the funnel 93 deposit the powder upon the record receiving member on the platen 26 just slightly in advance of the magnetic structure 81.

In operation of the apparatus described above as embodying the invention, a microfilm having frames to be copied is first placed upon the reels 14 and 16. When the proper frame has been adjusted in the film guide 18 the image is visible on the platen 26 when the door 100 of the enclosure 10 is slid open. The image of the film frame can be properly focused on the platen surface by adjustment of the lens system 23 through the lens access door 102. The projector light source in the housing 21 can then be turned off. A pilot light 106 is provided to illuminate the platen 26 when the door 100 is slid open which causes the cam 107 to actuate the switch 110. A pilot lamp switch is indicated at 110. A sheet of photoconductive paper 27 can then be inserted to rest on the platen 26 within the enclosure. The door 100 is then closed shutting off the pilot light 106 and sealing the entire enclosure from outside light.

Figure 3:
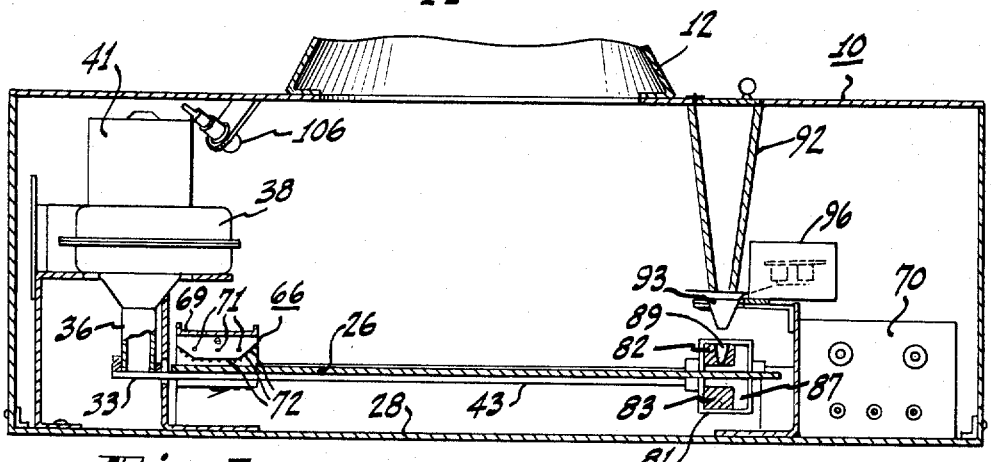
FIGURE 3 is an elevation in section of FIGURE 2 taken in the direction of the arrow A.

The charge button 53 is pressed. This actuates the lead screw motor 48 which causes the corona charger 66 as shown in FIGURE 3 to move completely across the surface of the paper and back again to its original position. Pilot light 111 connected across motor 48 indicates when lighted that the charger is in motion. When the corona device 66 passes over the face of the paper, it leaves a residual charge over its entire exposed face.

When pilot light 111 is extinguished, the exposure button 54 is then pressed. Pilot light 112 remains lighted only during exposure time. Time of exposure will vary up to 15 seconds depending on the composition of the paper. Control knob 105 is provided to adjust the exposure time. As the light strikes the surface of the paper it will liberate the charge where the light has contacted. Those areas shaded by the dark portions of the film will not lose their charge. A charge pattern will therefore be impressed upon the paper which will correspond to the light and dark portions of the film.

To make this latent charge image visible, the button 55 is then pressed which will operate the motor 51 turning the shaft 49 which carries the developer applicator brush supported on the magnetic structure 81 across the complete face of the paper and back again. A pilot light 113 indicates that the brush is in motion when lighted. The lines of flux which pass through the sheet of paper from pole pieces 82 to the pole piece 83 cause the ferromagnetic powder located on top of the paper to bunch together in brush-like bristles. Within these bristles, the electroscopic developer powder is sprinkled. The triboelectric quality of the bristles causes the electroscopic powder to cling intimately to the brush. As the brush travels over the charged latent image, the electroscopic powder will be attracted to the higher potential latent image.

The powder 125 which clings to the charged portions of the sheet is pigmented. When heat is applied in a heater (not shown) which may be situated in the base of the enclosure but separate from the light excluding enclosure as at 50, the powder 125 will fuse to the paper.

A permanent image or enlarged duplicate of the frame of film is therefore fused to the paper. This heater can also be included in a completely separate enclosure.

As stated above, FIGURE 4 shows the slot 89 in the top of the pole piece of the developer which provides a means for conveniently supplying powder to the ferromagnetic brush bristles. It is shown in FIGURE 5 how the bristles mutually repel each other to form a continuation throughout the bristles of the brush of the slot in the pole piece. As this slot is cut along substantially the entire length of the brush, powder can be supplied evenly throughout the entire length of the brush. The developer powder is evenly distributed insuring consistent pigment density in the finished print.

It will be understood by those skilled in the art that timer devices (not shown) may be employed to cyclically time the operations, described above, which can be made to occur in a definite sequence.

What is claimed is:

1. Electrostatic printing apparatus comprising means for supporting a member presenting a record receiving surface means for charging said surface, means to cause said charging means to traverse said surface, means for projecting a light image on said surface whereby to produce a latent electrostatic charge image on said surface, a magnetic structure comprising a magnetized polar member extending laterally of said surface, means to produce relative movement between said surface and said magnetized polar member to cause said polar member to traverse said surface, and means to maintain a quantity of developer mix having magnetic properties in contact with said polar member whereby said polar member is provided with brush-like streamers of said mix, said polar member being located with respect to the record receiving surface of said first named member so that said streamers contact said record receiving surface.

2. Electrostatic printing apparatus comprising means for supporting a member presenting a record receiving surface, means for charging said surface, means to cause said charging means to traverse said surface, and means for projecting a light image on said surface whereby to produce a latent electrostatic charge image on said surface, a magnetic structure comprising a magnetized polar member extending laterally of said surface and a second magnetized polar member disposed on the opposite side of said first named member, means to produce relative movement between said surface and said magnetized polar members to cause said polar members to traverse said surface, and means to maintain a quantity of developer mix having magnetic properties in contact with one of said polar members whereby said one polar member is provided with brush-like streamers of said mix, said one polar member being located with respect to the record receiving surface of said first named member so that said streamers contact said record receiving surface.

3. Electrostatic printing apparatus comprising means for supporting a member presenting a photoconductive latent image receiving surface, a substantially rectangular magnetic structure comprising a polar member disposed on one side of said first named member, a complementary polar member disposed oppositely to said first named polar member on the opposite side of said first named member, and a pair of similarly poled magnets joining said polar members at their ends.

4. The apparatus of claim 3 wherein one of said polar members has a slot therein for receiving electroscopic developer powder.

5. The apparatus of claim 3 including means for feeding electroscopic developer material to said first named polar member.

6. A microfilm printer of the electrostatic type comprising a light source, a film supporting means whereby frames of film can be selectively supported in the path of light emanating from said light source, a lens system whereby the image of said film illuminated by said light source can be projected on a photoconductive surface as an enlarged image, a member having a flat surface for supporting a photoconductive sheet of a character which will accept a residual charge and will liberate the charge selectively from portions which are struck by light and retain said charge where not contacted by said light, electrostatic charging means positioned to impose an electrostatic charge upon a sheet disposed on said flat surface, a pair of pole pieces on opposite sides of said member, said pole pieces being adapted to have ferromagnetic powder suspended therebetween to provide brush means whereby an electroscopic developing powder is triboelectrically retained and placed in intimate brushing contact with the photoconductive charged and light exposed surface of a sheet on said member.

7. The combination set forth in claim 6 wherein said pole piece overlying said flat surface is slotted substantially across its entire length whereby to provide for adding developer powder to said brush means.

8. The combination set forth in claim 6 combined with pressure reducing means below said member having a flat surface whereby a sheet is firmly held to the surface of said member while being brushed with developer powder.

9. The combination set forth in claim 6 including guide means and wherein means are provided to cause said charging means to travel transversely over a sheet on the surface of said member and return to its original position on said guide means, and means whereby said developer powder brushing means travels transversely over said surface and back to its original position on said same guide means.

10. A developer powder applicator for electrostatic printing comprising a support for an electrostatic image bearing sheet, a pair of magnetic pole means producing a first magnetic polarity in a plane above said support and an opposite magnetic polarity in a plane below said support to cause lines of magnetic flux to pass through a sheet on said support, one of said pole means being longitudinally slotted throughout the major portion of its length to provide means for feeding electroscopic developer powder and ferro-magnetic particles to said plane above said support to form brush-like bristles thereof within the region of said magnetic flux and to produce by mutual repulsion a longitudinal division of the brush so formed, and means for moving said pair of magnetic pole means relative to said support to bring said brush like bristles into contact with substantially all areas on said image bearing sheet.

*11. A charging and developing apparatus for use in electrostatic printing comprising a light tight housing, means for holding in fixed position therein a sheet treated with photoconductive material at an exposure position wherein the latent image of an object to be copied may be formed, electrostatic charging means, means mounting said charging means for movement across the treated side of said sheet to charge the same, means for exposing said charged sheet and forming a latent image on the charged side thereof, magnet means for forming a brush containing developing material and applying the same to said side of the sheet on which is disposed said latent image, means mounting said magnet means for movement substantially parallel to the sheet between a rest position at said side of the sheet, across the sheet and backwardly to the rest position, said magnet means being arranged to operate subsequent to the operation of said exposing means, and means for imparting movement to said charging means and said magnet means.*

*12. An apparatus according to claim 11, wherein said movement imparting means for the charging means is arranged to move the same substantially parallel to the treated sheet between a rest position at said side of the*

*sheet, across the sheet and backwardly to said rest position.*

*13. A charging and developing apparatus for use in electrostatic printing comprising a light tight housing, means for holding in fixed position therein a sheet treated with photoconductive material at an exposure station wherein the latent image of an object to be copied may be formed, electrostatic charging means, means mounting said charging means for movement across the treated side of said sheet to charge the same, means for exposing said charged sheet and forming a latent image on the charged side thereof, developing means for applying developing material to said side of said sheet on which is disposed said latent image, means mounting said developing means for movement substantially parallel to the sheet between a rest position at said side of the sheet, across the sheet and backwardly to the rest position, said developing means being arranged to operate subsequent to the operation of said exposing means, and means for imparting movement to said charging means and said developing means.*

*14. An apparatus according to claim 13, wherein said movement imparting means for the charging means is arranged to move the same substantially parallel to the treated sheet between a rest position at said side of the sheet, across the sheet and backwardly to said rest position.*

References Cited by the Examiner

The following references, cited by the Examiner, are of record in the patented file of this patent or the original patent.

UNITED STATES PATENTS

| | | | |
|---|---|---|---|
| 573,485 | 12/96 | Sanders et al. | |
| 731,446 | 6/03 | Forsgren. | |
| 832,820 | 10/06 | Snyder. | |
| 1,062,522 | 5/13 | Ullrich. | |
| 1,549,875 | 8/25 | Horne. | |
| 1,820,194 | 8/31 | Huebner. | |
| 1,828,958 | 10/31 | Canton. | |
| 1,851,028 | 3/32 | Worrall. | |
| 2,221,776 | 11/40 | Carlson | 95—1.7 X |
| 2,239,970 | 4/41 | Osborne . | |
| 2,297,691 | 10/42 | Carlson | 95—1.7 X |
| 2,357,809 | 9/44 | Carlson | 95—1.7 X |
| 2,468,400 | 4/49 | Huebner. | |
| 2,495,528 | 1/50 | Langan. | |
| 2,517,174 | 8/50 | Bradley. | |
| 2,588,675 | 3/52 | Walkup et al. | |
| 2,618,551 | 11/52 | Walkup. | |
| 2,624,652 | 1/53 | Carlson. | |
| 2,693,416 | 11/54 | Butterfield | 95—1.7 |

EVON C. BLUNK, *Primary Examiner.*

DELBERT B. LOWE, *Examiner.*